United States Patent
Ren et al.

(10) Patent No.: US 7,076,755 B2
(45) Date of Patent: Jul. 11, 2006

(54) METHOD FOR SUCCESSIVE PLACEMENT BASED REFINEMENT OF A GENERALIZED COST FUNCTION

(75) Inventors: Haoxing Ren, Austin, TX (US); Paul Villarrubia, Austin, TX (US); Zahi M. Kurzum, Poughkeepsie, NY (US); Shyam Ramji, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 10/707,942

(22) Filed: Jan. 27, 2004

(65) Prior Publication Data

US 2005/0166164 A1   Jul. 28, 2005

(51) Int. Cl.
 *G06F 17/50* (2006.01)
(52) U.S. Cl. .................. 716/9; 716/2; 716/7
(58) Field of Classification Search ............. 716/7–10, 716/12–13, 2
See application file for complete search history.

(56) References Cited

U.S. PATENT DOCUMENTS

| | | | |
|---|---|---|---|
| 5,654,898 A | 8/1997 | Roetcisoender et al. | |
| 5,666,290 A | 9/1997 | Li et al. | |
| 5,798,936 A * | 8/1998 | Cheng | 716/13 |
| 6,068,662 A | 5/2000 | Seepanovic et al. | |
| 6,070,108 A | 5/2000 | Andreev et al. | |
| 6,075,933 A | 6/2000 | Pavisic et al. | |
| 6,099,580 A | 8/2000 | Boyle et al. | |
| 6,123,736 A | 9/2000 | Pavisic et al. | |
| 6,192,508 B1 | 2/2001 | Malik et al. | |
| 6,249,902 B1 * | 6/2001 | Igusa et al. | 716/10 |
| 6,263,478 B1 | 7/2001 | Hahn et al. | |
| 6,272,668 B1 | 8/2001 | Teene | |
| 6,286,128 B1 | 9/2001 | Pileggi et al. | |
| 6,324,678 B1 * | 11/2001 | Dangelo et al. | 716/18 |
| 6,415,426 B1 | 7/2002 | Chang et al. | |
| 6,523,161 B1 | 2/2003 | Gopalakrishnan et al. | |
| 6,557,144 B1 | 4/2003 | Lu et al. | |
| 6,591,407 B1 | 7/2003 | Kaufman et al. | |
| 6,601,226 B1 | 7/2003 | Hill et al. | |
| 2004/0243964 A1 * | 12/2004 | McElvain et al. | 716/12 |

* cited by examiner

*Primary Examiner*—Stacy A. Whitmore
(74) *Attorney, Agent, or Firm*—H. Daniel Schnurmann

(57) ABSTRACT

A generalized method for optimizing the global placement of a VLSI chip across multiple cost metrics, such as total wire length, timing, congestion, and signal integrity is described. The method relies upon a "look ahead" technique, combined with any generic cost function that can be used to set placement directives. These placement directives include net weights and cell spreading. The method of performing the placement involves the iterative reuse of the process of successive partitioning. This iterative reuse establishes the capability of looking ahead to determine what is to happen. Based on the look ahead, it is possible to evaluate the qualities of the placement about to be generated. The method proceeds through the placement from while maintaining the current state of the placement along with the look-ahead state of the placement. Directives are generated and modified in order that the next steps applied to the current state of the placement will cause it to change to achieve an ultimate higher quality final output.

15 Claims, 8 Drawing Sheets

```
1.         placement_flow(N)
           {
2.             K = user_specified_value;
3.             Look_ahead_factor = user_spedified_value;
4.             M = N * look_ahead_factor;

5.             do_M_cuts();
           /* Next 3 lines: perform optimization (timing, power, congestion, signal integrity,
           etc) */
6.             do_cost_function_analysis
7.             do_cost_function_optimization
8.             generate_placement_directives 9.             restore_placement_to_cut(K);
10.            do_remaining_cuts_K_to_N();
           }
```

Figure 3

```
1.      Placement_flow(N)
        {
2.      K = user_specified_value1;
3.      Look_ahead_factor = user_specified_value2;
4.      Forward_increment = user_spedified_value3;
5.      C = user_specified_value4;
6.      K = C – forward_increment;
7.      Do_K_cuts();  /* cut = K */

8.      M = N * look_ahead_factor;
9.      While ((iterations < max_iterations) & (K < N));   /* termination criteria */
        {
10.     restore_placement_for_cut_K(); /* cut = K */
11.     do_cuts_K_through_M();

12.     /* perform optimization (timing, power, congestion, signal integrity, etc) */

13.     do_cost_function_analysis()
14.     do_cost_function_optimization()
15.     generate_placement_directives()
16.     K = K + Forward_Increment;
17.     If(K > N) K = N;
18.     M = M + Forward_Increment;
19.     If ( M > N) M = N;
        }
20.     if (cut != N)
        {
21.     K = cut;
22.     Do_cuts_K_through_N();
        }
        }
```

Figure 4

```
1.      placement_flow(expansion_rate)
        {
2.      do_M_cuts();
3.      run_global_router();
4.      congestion_map = congestion_estimation();
5.      expand_cells (congestion_map, expansion_rate);
6.      insert_blockage(congestion_map);
7.      undo_cuts_K_to_M();
8.      do_remaining_cuts_K_to_N();
        }
9.      expand_cells (congestion_map, expansion_rate)
        {
10.     for each movable 1byn cell in a vertical congested grid
            {
11.         base_expansion = base_expansion + pin_number / cell_width
12.         congested_cell_area = congested_cell_area + cell_width
            }
13.     target_expansion = congested_cell_area * expansion_rate
14.     K = target_expansion / base_expansion;
15.     for each movable 1byn cell in a vertical congested grid
            {
16.         new_cell_width = cell_width + pin_number / cell_width * K
17.         assign new_cell_width to the cell
            }
        }

18.     insert_blockage(congestion_map)
        {
19.     identify horizontal congested grids
20.     create rectangle regions by merging neighboring horizontal congested
        grids for each region
            {
21.         N = blockages density, which is depend on congestion degree
22.         create blockage every N number of circuit row with one
            circuit row high and region wide
            }
        }
```

METHOD FOR SUCCESSIVE PLACEMENT BASED REFINEMENT OF A GENERALIZED COST FUNCTION

BACKGROUND OF INVENTION

The invention is generally related to the field of Electronic Design Automation as applied to the design of semiconductor chips, and more specifically, to a method for optimizing the placement of cells on the chip.

Placement has been an integral part of any VLSI chip design for many decades. Several approaches exist in the art for solving the placement problem. One of the most successful ones, known as partitioning, has been widely described in the technical literature, as for instance, by R. S. Tsay, E. S. Kuh and C. P. Hsu, "PROUD: a Sea-of-Gates Placement Algorithm", published in IEEE Design & Test of Computers, Vol. 5, December 1988; by J. M. Kleinhans, G. Sigl and F. Johannes; "Gordian: A New Global Optimization/Rectangle Dissection Method for Cell Placement", published in the Proceedings of the International Conference on Computer-Aided Design, pp. 506–509, 1988; and by G. Sigl, K. Doll and F. Johannes, "Analytical Placement: A Linear or Quadratic Objective Functions?", published in the Proceedings of the Design Automation Conference, pp. 427–432, 1991.

An input to the placement process consists of a VLSI chip physical footprint that includes positioning the I/O (input/output) ports that connect the chip to the external world. Additionally, a description of the chip area is selected in order to assign physical locations corresponding to the circuits forming the chip. A second input consists of a chip level netlist that describes all the circuits that are to be placed. The description of the circuit includes attributes such as size, pin location, power connection ports and their respective locations. The netlist file also includes a description of the cell connectivity. In most instances, the location attribute is empty, and it is for the placement process to assign the locations. In some instances, cells in the netlist are preplaced at fixed locations, in which case the placement tool is expected to honor the location attribute according to the input data. The placement process assigns locations to all the objects present in the input netlist. The locations must be valid (i.e., legal) and non-overlapping, (i.e., the circuits must be placed in accordance to the description of the chip area—one of the inputs). Many such placement algorithms meeting these criteria are already in existence.

An ideal placement process is one that optimizes the characteristics of the VLSI chip by generating a routable placement characterized by having a minimum total wire length, a minimum timing cost, and a minimum signal integrity cost, wherein the cost is defined as a function of the following parameters:

a) the total wire length consisting of the sum of the wire lengths over all the nets of the netlist. Individual net lengths are computed using Steiner and Net-Half Perimeter methods. The Steiner wire length of a net is computed by generating a Steiner routing pattern, i.e., one that connects all of the pins on a net using horizontal and vertical line segments. These line segments may intersect each other at points that do not correspond to net pins. Such points are known as Steiner points. The length is then computed after the Steiner pattern is generated by adding the sum of the lengths of each individual horizontal and vertical line segment. This value is then used to represent the length of the net. The net-half-perimeter wire length refers to a method used for estimating the wire length. It involves creating a rectangle such that all the pins on the net remain within or at the boundary of the rectangle. Furthermore, the rectangle generated must be as small as possible and still satisfy all the aforementioned conditions. Finally, the perimeter of this rectangle is measured and halved, yielding a value known as the net-half-perimeter;

b) congestion, that defines the degree of routability of the design. Most commercial routers offer a global routing component providing this metric;

c) timing, that defines the intrinsic timing characteristics of the placement, computed by first repowering and buffering the design to be followed by a timing analysis; and d) signal integrity, that qualifies the capacitive net coupling potential of the placement, and the probability of such coupling leading to functional and/or timing related problems.

Referring now to FIG. 1 there is shown a representation of a conventional placement sequence.

Figure 1A:
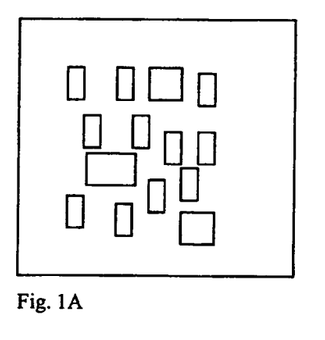
FIGS. 1A–1E are pictorial representations of a conventional placement sequence.
Figure 1B:
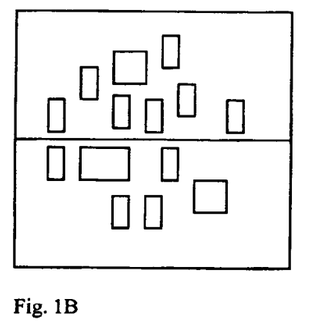
Figure 1C:
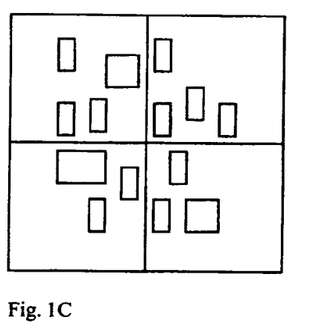
Figure 1D:
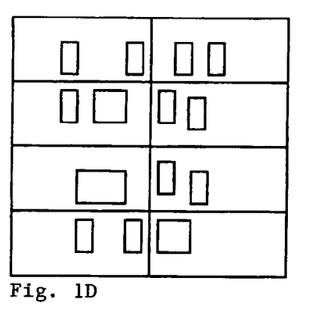
Figure 1E:
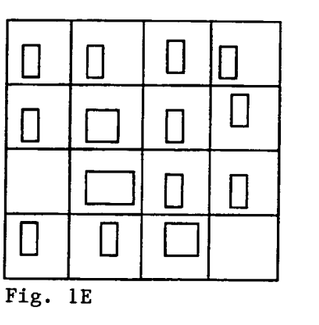

Partitioning uses a "divide and conquer" approach to achieve its objectives. Initially, and referring to FIG. 1A, all the circuits are randomly placed on the chip regardless of the cost function optimization. In the case of a two-way partitioning (FIG. 1B), the chip is subdivided in two regions. The process of subdivision will be referred hereinafter as a "cut". Starting from the rectangular outline of the entire chip, it is accomplished by drawing a vertical (or horizontal) line through the middle of the chip. The partitioning line together with the full chip outline defines the two regions. The next step consists in taking all the circuits falling within a window bounded by the two regions and assigns them to either region 1 or region 2 in a manner that minimizes the connectivity of the circuits in both regions. The remaining regions are then subdivided, as shown in FIGS. 1C–1E. The process proceeds recursively until each circuit is assigned a specific location in the chip. The process described thus far corresponds to the aforementioned two-way partitioning.

It is possible to perform two cuts at a time to achieve a four-way partitioning. The initial state of a four-way partitioning is based on circuits randomly placed on the chip that were previously shown in FIG. 1A. The placement step that follows corresponds to FIG. 1C, while the third state corresponds to FIG. 1E. This pattern continues until the end of the placement sequence is reached. The invention described herein applies to the general partitioning case that includes both, a two-way and a four-way partitioning.

In a more general way, a complete successive partitioning pass starts at cut 1 and terminates at cut N. Referring to FIG. 1B, the placement shown therein results from cut number 1, while FIGS. 1C–1E depict the results from cuts number 2, 3, and 4 This pattern continues until cut number N is reached, corresponding to a fully placed netlist, wherein the number of partitions is sufficiently small to specify its detailed placement qualities. The value of N is computed by the following equation 1:

$$N = \log_2(\text{image\_area}/\text{smallest\_cell\_size}) \qquad (1)$$

The image area variable in equation (1) is a measure of the amount of circuitry that is to be placed on the chip. The smallest_cell_size variable is a measure of the area occupied by one occurrence of the cell. Dividing the image area by the smallest_cell_size, the maximum number of cells that can possibly be placed on the chip is determined. By taking the $\log_2$ of this number, the number of two-way partitioning operations required to have all the final partitions on the chip having only one cell is computed.

In previous generations of a VLSI design, placement was performed in a single stand-alone step, with a primary objective of generating a routable design (refer to the congestion cost metric described above) having a minimum total wire length. Since then, the technology trend has gravitated toward larger design sizes, concentrating rather on the chip performance determined by the inter-connect delay, and which is considered be a stronger function of the placement solution. Thus, the importance of optimizing the placement beyond the total wire length and congestion has now acquired a new and higher level of importance. As a result, placement algorithms are now imbedded into timing closure systems (like PDS, Magma's tools, Synopsys PD compiler, Cadence PKS, etc), where the placement itself is only one aspect of the optimization paradigm. These modern generation tools are designed to optimize the placement across many metrics, such as wire length, congestion, timing, and signal integrity.

Simultaneous optimization of the cost functions is difficult in view of certain cost functions competing against one another. By way of example, better timing may require extra wire length, which is in direct conflict with the goal of minimizing the wire length. The same can be said with regard to congestion and wire length, i.e., reducing congestion by increasing total wire length. In addition to internal cost function conflicts there are also other important optimizations such as timing, power, and signal integrity that are not easily visible to a native placement algorithm. For these reasons, it becomes more difficult to achieve the optimal placement.

Accordingly, there is a need for a general framework to achieve an optimal placement that specifically addresses optimizations that include global qualities of the placement solution, defined as those related to the most significant organization of logic placed on the VLSI chip. This need is particularly important for VLSI chips that include a hierarchy of logic functions. For instance, individual circuits are normally handled at the leaf level of the hierarchy. Moving up the hierarchy, there is a coarsening of the structure that reflects larger and larger logic groupings. It is this relative placement of larger logic groupings that defines the global qualities of the placement. The relative ordering and specific placement of circuits within the "larger logic groupings" relates to the local quality of the placement solution. It should be understood that the quality of the placement spans across a spectrum that includes global qualities on one end, and local qualities on the other. In the middle of the spectrum, there is a blend of global and local qualities.

Several approaches addressing congestion and timing optimization during placement are found in the literature. Techniques for optimization of congestion have been described, for instance, in:

U.S. Pat. No. 6,068,662, Method and Apparatus for Congestion Removal, issued to Scepanovic, et al;

U.S. Pat. No. 6,075,933, Method and Apparatus for Continuous Column Density Optimization, issued to Pavisic, et al.;

U.S. Pat. No. 6,123,736, Method and Apparatus for Horizontal Congestion Removal, issued to Pavisic, et al.; and U.S. Pat. No. 6,070,108, Method and Apparatus for Congestion Driven Placement, issued Andreev, et al.

The techniques described therein involve the application of cell spreading following the placement step itself. A drawback of this approach is that they do not allow changes in the global qualities of the placement to be applied to the optimization. Post-placement techniques, such as cell spreading, do not alter the global component of the placement solution. They are valuable for other reasons, as described, e.g., in patent application Ser. No. 10/063,837, "Congestion Mitigation with Logic order Preservation" that falls in this category of algorithm.

Techniques for optimizing a placement based on timing considerations are described in several patents and can be divided into three categories. The first category generally involves the application of simple timing driven net weighting for placement followed by an in-place optimization (IPO) step. These approaches are limited in their ability to modify the global placement in order to achieve optimization. Examples can be found in:

U.S. Pat. No. 6,591,407, Method and Apparatus for Interconnect-Driven Optimization of Integrated Circuit Design, issued to Kaufman, et al.;

U.S. Pat. No. 6,272,668, Method for Cell Swapping to Improve Pre-layout to Post-layout Timing, issued to Teene;

U.S. Pat. No. 6,263,478, System and Method for Generating and using Stage-Based Constraints for Timing-Driven Design, issued to Hahn, et al.;

U.S. Pat. No. 6,192,508, Method for Logic Optimization for Improving Timing and Congestion during Placement in Integrated Circuit Design, issued to Malik, et al.; and U.S. Pat. No. 6,523,161, Method to Optimize Net Lists using Simultaneous Placement and Logic Optimization, issued to Gopalakrishnan, et al.

The second category applies recursive global placement and timing analysis during the forward progression of the algorithm. Examples of these are found in:

U.S. Pat. No. 6,415,426, Dynamic Weighting and/or Target Zone Analysis in Timing Driven Placement of Cells of an Integrated Circuit Design, issued to Chang, et al.;

U.S. Pat. No. 6,557,144, Netlist Re-synthesis Program Based on Physical Delay Calculation, issued to Lu, et al.;

U.S. Pat. No. 6,099,580, Method for Providing Performance-Driven Logic Optimization in and Integrated Circuit Layout Design, issued to Boyle, et al.; and U.S. Pat. No. 5,654,898, Timing-Driven Integrated Circuit Layout through Device Sizing, issued to Roetcisoender, et al.

The third category uses dynamic net weight adjustment and simple logic optimization during placement. Examples are found in: U.S. Pat. No. 6,601,226, Tight Loop Method of Timing Driven Placement, issued to Hill, et al.;

U.S. Pat. No. 5,666,290, Interactive Timing-Driven Method of Component Placement that more directly constrains Critical Paths using Net-Based Constraints, issued to Li, et al.; and U.S. Pat. No. 6,286,128, Method for Design Optimization using Logical and Physical Information, issued to Pileggi, et al.

The referenced patents categorized in the three aforementioned categories lack the all important "look ahead" characteristic which forms the basis for an efficient optimization, and which includes those related to timing optimization and congestion optimization. The look ahead technique allows the process to closely control the optimization qualities result thereof.

SUMMARY OF INVENTION

Accordingly, it is an object of the invention to provide a generalized method for optimizing the global placement characteristics of a VLSI chip across multiple cost metrics, such as total wire length, timing, congestion, and signal integrity. The method relies upon a "look ahead" technique, combined with any generic cost function that can be used to set placement directives. These placement directives include net weights and cell spreading.

It is another object to provide a method for optimizing congestion that operates within the generalized method.

It is a further object of the invention to provide a method for optimizing timing that operates within the generalized method.

The foregoing and other objects are achieved by a method of performing a VLSI placement that involves the iterative reuse of the process of successive partitioning. It is the iterative reuse component of the invention that establishes the capability of "looking ahead" to determine what will happen. Based on the look ahead, it is possible to evaluate the qualities of the placement about to be generated. The method of the present invention proceeds through the placement while maintaining the current state of the placement alongside the look-ahead state of the placement. Based on a continuous evaluation of the look-ahead placement, directives are generated and modified in order that the next steps applied to the current state of the placement will cause it to change to achieve an ultimate higher quality final output.

This invention decouples the analysis functions/directive generation techniques from the placement flow itself. The essence of the invention is that it establishes a paradigm for optimizing the placement that allows any generic cost function/directive generation technique to be incorporated therein. This invention also includes two instances of optimization cost functions/directives generation. The first instance is the optimization of timing and the second instance optimization of wiring congestion.

In another aspect of the invention, there is provided a method for optimizing the placement of a plurality of cells on a VLSI chip that includes the steps of: a) subdividing the plurality of cells into partitions by performing a sequence of cuts; b) iteratively managing the sequence of cuts to perform a look ahead operation; c) returning to the cut from where the look ahead operation was initiated by comparing the original placement with the cut provided by the look ahead operation; and d) altering the priority of the placement to ensure that the quality of the results achieved at the look ahead point is improved.

BRIEF DESCRIPTION OF DRAWINGS

The accompanying drawings, which are incorporated in and which constitute part of the specification, illustrate presently preferred embodiments of the invention and, together with the general description given above and the detailed description of the preferred embodiments given below, serve to explain the principles of the invention.

DETAILED DESCRIPTION

Figure 2:
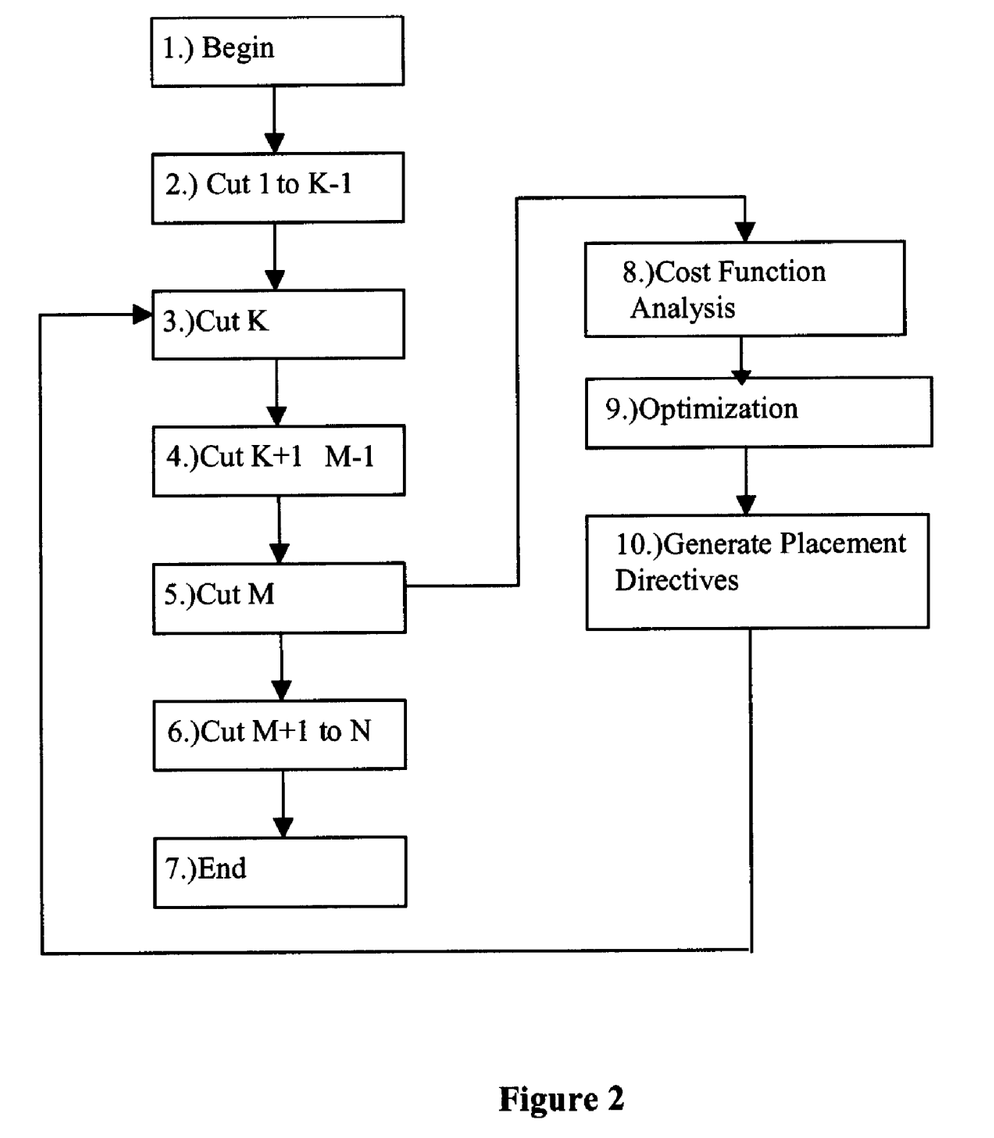
FIG. 2 is a flowchart showing the method steps for performing placement optimization relative to a given cost function, in accordance with the present invention.

Referring now to FIG. 2, there is shown a flowchart illustrating the method steps for performing the placement optimization relative to a given cost function, in accordance to the present invention.

The inventive method uses a successive partition placement flow iteratively. In step 2 of the iteration, the flow begins at cut 1 and ends at cut M (step 5). Cut M is determined by the algorithm to be a value such that M<N, but sufficiently close to N to allow a placement approximation. Next, the approximated placement from step 2 is evaluated using predefined cost metrics. Based on the evaluation of the cost metrics, directive inputs to placement are specified. This evaluation and directive generation step is shown in steps 8, 9, and 10.

Still referring to FIG. 2, steps 3–5 perform a placement from cut K (step 3) through M (step 5). When the iteration M>K>1 is reached, K is selected so that the starting point of the second iteration captures some global qualities of the initial placement. Likewise, M is computed in accordance with the desired level of placement approximation for the second iteration. Generally, the quality of the placement approximation is expected to increase as the algorithm moves from one step to the next. Steps 3–5 are repeated with the same sequence previously described. For each iteration, the values of K and M increase and the cost functions are re-evaluated, providing directives to the placement algorithm. At the end of the last step of the placement step, the values from M to N are compared. If M<N, the placement process continues until cut N is performed, at which point, the complete placement is available. The process of successive placements that is based on the refinement of a generalized cost function can be described with reference to FIGS. 1, 2, 3, and 4. Subsequently, FIGS. 5 through 8 will show specific applications of the present invention.

Figure 3:
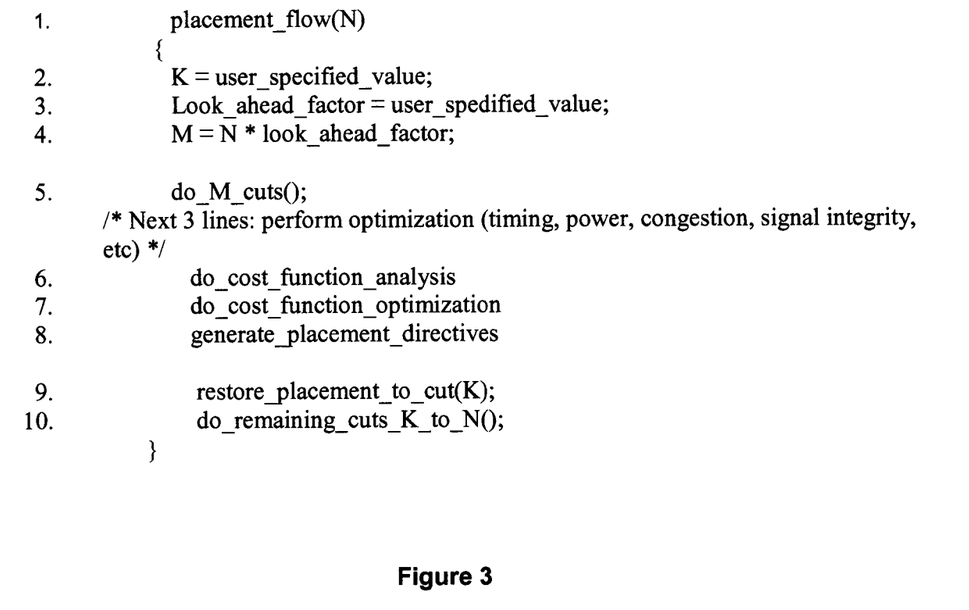
FIG. 3 is an algorithmic description of the placement flow for a single optimization iteration.

FIG. 3 describes the algorithmic implementation that corresponds to the flow chart shown in FIG. 2. It is a representation of a special case of the optimization algorithm that limits the number of optimizing iterations to 1. In this special case, the code first performs M cuts (FIG. 3, line 5), in accordance with standard partitioning paradigm described earlier, and depicted with reference to FIG. 1. There are two user inputs to the algorithm. The first is K (FIG. 3, line 2), the value of a cut at which the optimizations are to be applied, while looking ahead to a down-stream cut. The second user input, shown in line 3, corresponds to the aforementioned look_ahead_factor. This variable is user specified and is set to instruct the application to perform the optimizations based on a quantified look ahead value that computes cut M, the exact cut at to which the look-ahead is to occur. The exact mechanics of this operation calls for optimizations to be applied at cut M followed by an immediate restoration of the placement to cut K. Since the intent is to restore the placement to cut K, moving therefrom onward, this sequence will be referred to hereinafter as optimization at cut K with look ahead to cut M (FIG. 3, line 4).

Figure 4:
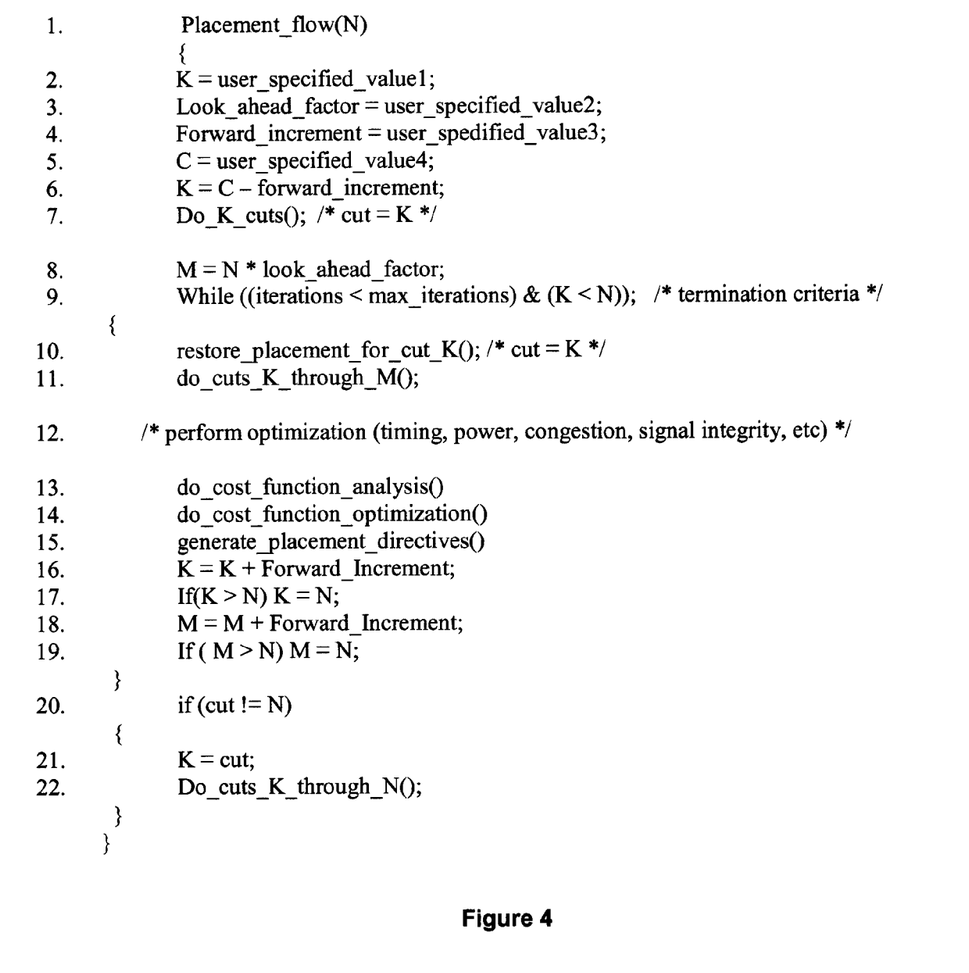
FIG. 4 is an algorithmic description of the placement flow for a generalized number of optimization iterations.

FIG. 4 illustrates a generalized description of the algorithmic corresponding to the flow chart shown in FIG. 2. Therein is shown how to generalize the inventive method to any number of optimization iterations. In the most general case, there are four user specified values that control the iteration flow. The first is the look_ahead_factor (FIG. 4, line 3). Just as in FIG. 3, this value directs the application to perform optimizations based on a quantified look ahead value that computes cut M. The second input is the forward_increment (FIG. 4, line 4) that computes the values of K and M for each iteration of the algorithm. It is required to be greater than 0. The third user specified value is the max_iterations value (FIG. 4, line 9) that controls the maximum number of iterations to be performed. In the case of multiple optimization passes, the termination criterion is based on the max_iterations paramater and the value of K (FIG. 4, line 9), which is incremented following each iteration. The fourth user input is C, that pinpoints the value at which the first optimization is to be performed.

The algorithm proceeds as follows. Starting at cut number 1 the algorithm performs K cuts, where K=C forward_increment (FIG. 4, line 6). At this point, the forward_increment value is deducted from C, but is added back near the end of iteration 1 (FIG. 4, line 16). This causes the iteration 1 to return to iteration 2, i.e., at cut K. Next, the value of M is computed by multiplying N by the user specified look_ahead_value (FIG. 4, line 8). Herein, the main body of the optimization iteration is entered, assuming that the user has specified a max_iterations greater than 0. If the max_iterations value is equal or less than 0, the optimization iteration is skipped, and the remainder of the placement process continues, defaulting to a standard placement algorithm with no optimization possible. In the case where max_iterations >0, the main body of the optimization iteration is entered (FIG. 4, line 10) and the placement associated with cut K is restored. On the first time through this loop, the process already stands at cut K, thus nothing happens. At subsequent times through the loop, the restoration process changes the placement accordingly. In line 11, the algorithm performs the look-ahead process by processing cuts K through M. In lines 13, 14, and 15, the algorithm performs a cost function analysis, optimization, and then generates the placement directives. In line 16, the value of K is incremented according to the user specified forward increment. In line 17, K is compared to N (the last cut). If K>N, it is forced to be equal to N, which according to line 8 causes the optimization iteration to terminate. In line 18, M is incremented according to the user specified forward increment. In line 19, M is compared to N. If M>N, it is forced to be equal to N. All the incremental values are required to be greater than zero. The algorithm terminates according to the termination criteria set in line 9, either if the value of K is incremented to N or if the max_iterations value is reached. The algorithm as specified in the general case performs a number of placement optimization iterations. During the early iterations, the placement optimizations occur at the early cuts, and the look ahead occurs at a cut number that is farther removed from the last cut. As the iterations proceed, the optimization window moves to cuts that are closer to the end of the placement sequence. In this way, a continuous optimization iteration is achieved resulting in an improvement of the global qualities and local qualities of the placement. The early iterations focus more on the global qualities while the later iterations migrate toward the local qualities of the placement. In this way, a continuous optimization of the placement covering the spectrum from global to local placement optimization is achieved.

Figure 7:
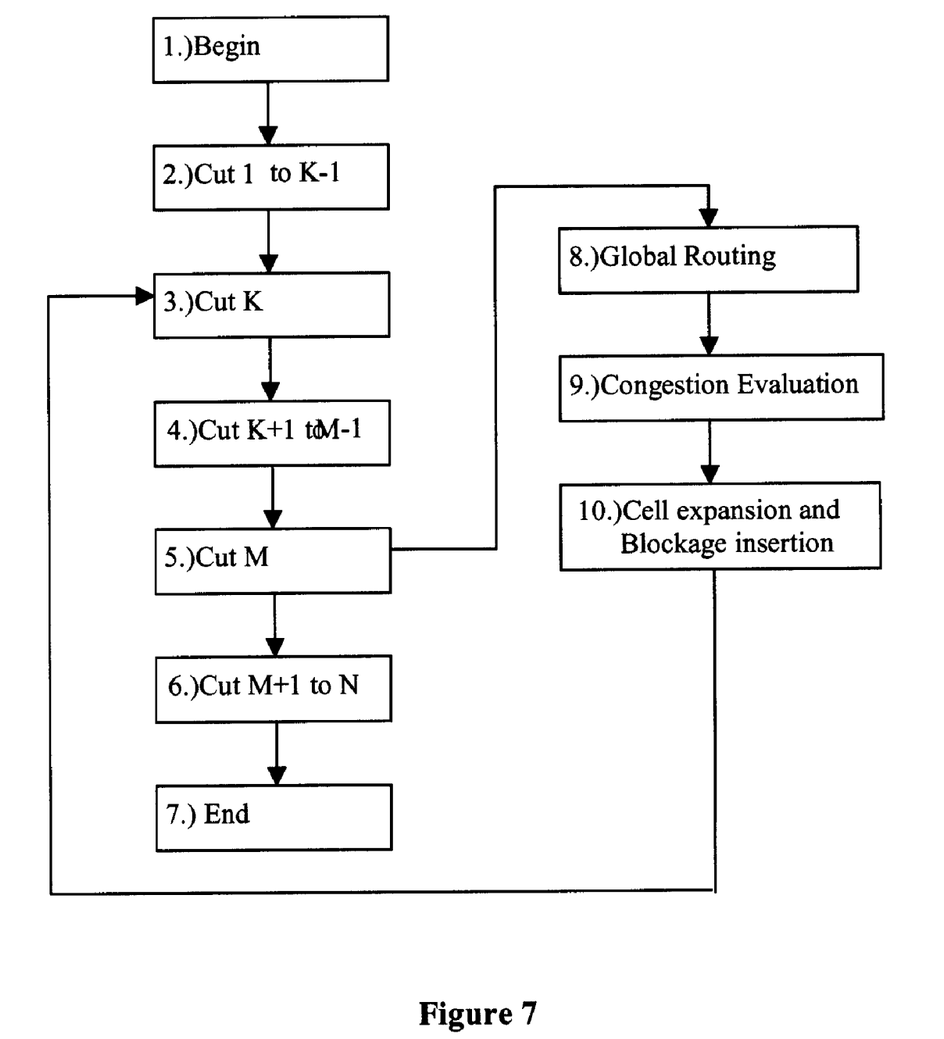
FIG. 7 illustrates the algorithm, according to the present invention, as applied to congestion avoidance.
Figure 8:
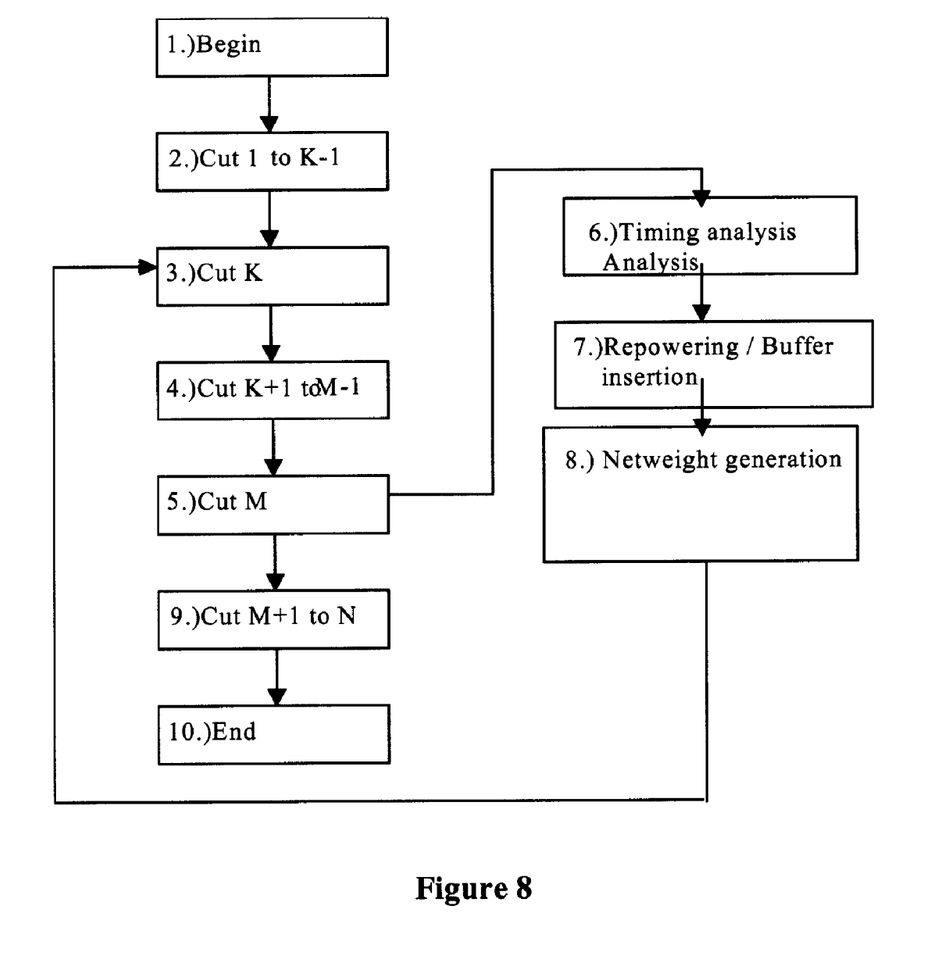
FIG. 8 illustrates the algorithmic description, according to the invention, as applied to timing optimization.

Application of the Present Method to Congestion Optimization. The congestion optimization will now be described with reference to FIG. 7. The generic iteration occurs as previously described. The content of the optimization section involves invoking a global router followed by an analysis of the global route results. Based on the analysis placement, directives are generated, including those related to cell spacing and area avoidance. The cell spacing directive is specified by artificially expanding the cell sizes. This is referred to "cell expansion". A blockage is generated to direct the placement algorithm while avoiding placing cells in certain areas. In FIG. 7, this is shown by a "blockage insertion".

Figure 5:
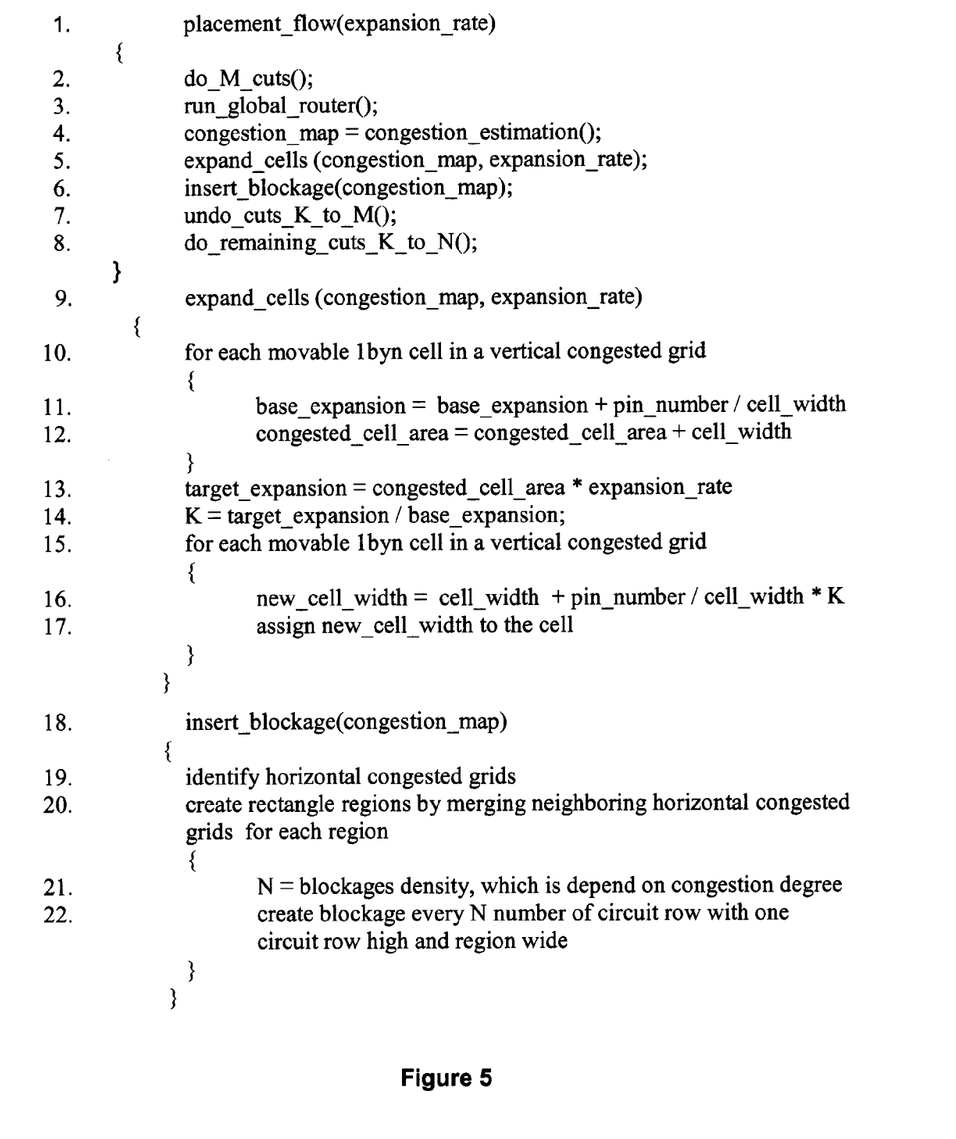
FIG. 5 is an algorithmic description specifically used for congestion removal, in accordance with the invention.

The algorithm specification for the flow corresponding to FIG. 7 is found in FIG. 5. Shown therein is the code used in the top level flow that includes a single optimization iteration, generically documented in the code of FIG. 3.

A description of the congestion optimization flow follows. According to FIG. 5, the placement_flow( ) first performs M cuts (FIG. 5, lines 1–2). Next, the global router is invoked, which generates a global routing map. This is well known in the art. The global routing map reflects the degree of wirability of all the areas of the chip. For congestion evaluation purposes, the die area is subdivided into n by n grids. Each grid consists of 30 routing tracks wide and high. Next, the supply (Ws) and the demand (Wd) are computed. The wiring supply on the edge of a grid is computed by:

Ws=(number of layers)(edge length) blockage, and by power shapes crossing the edge. The wiring demand (Wd) is provided by the global router. Wiring congestion is defined as:

$Cedge = Wd/Ws.$

Finally, the horizontal congestion for the grid is defined as:

$H\_grid=(Cedge\_left+Cedge\_right)/2,$ wherein Cedge_left and Cedge_right are congestion values associated with the left and right edges, respectively. Similarly, the vertical congestion of the grid is given by:

$V\_grid=(Cedge\_bottom+Cedge\_top)/2,$ wherein Cedge_bottom and Cedge_top are the values respectively associated with the bottom and top edges. These congestion values determine where a corrective action is necessary and for which placement directives need to be specified.

FIG. 5 shows a technique referred to expand_cells( ). This technique is invoked on cells residing within areas that exceed a user specified congestion value. The result of this action is a placement directive that is generated to force the cells to spread out, thereby modifying the ratio of wiring resource available versus cells that are to be wired. Reducing this ratio directly affects the congestion score by reducing the wiring demand in the local vicinity.

Figure 6:
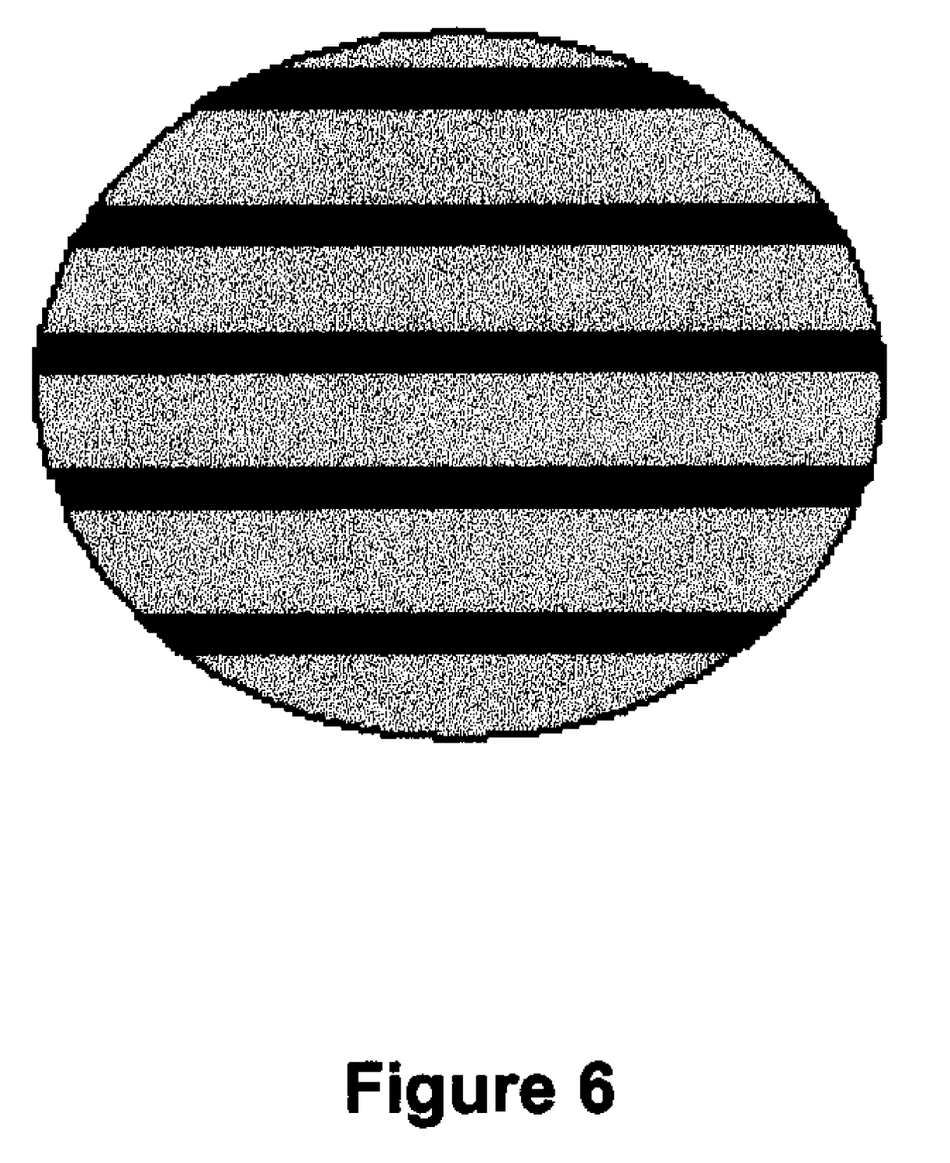
FIG. 6 is a pictorial representation for reserving areas for routability where congestion occurs, with the black stripes showing the blockages created.

Although expanding all the cells helps to optimize both the horizontal and vertical congestion, an additional technique is used to specifically address horizontal congestion problems. This technique involves creating placement blockages in the horizontal congested areas. Examples of these blockages are shown in FIG. 6. The horizontal dark stripes identify areas to be left vacant by the placement tool. These are specified by creating a construct known as blockage and forwarding it to the placement tool as part of the directives. The criterion for generating the horizontal blockage strip is similar to what was previously described. The difference is that only the horizontal edge congestion is used. Blockages are introduced based on areas that have horizontal edge congestion that exceeding a user specified value.

In summary, the steps of global routing, congestion analysis, cell expansion, and blockage generation (FIG. 5) are used with the optimization paradigm of this invention (FIG. 4) to achieve a placement process that is optimized for congestion.

Application of the Method for Placement based timing optimization. The application of present invention to the task of a placement based timing optimization can best be described with referred to FIG. 8. Therein, a generic optimization flow described in FIGS. 1, 2, 3 and 4 is once again applied. In the present case, the optimization functions are suited for addressing timing related issues. The algorithm proceeds as usual by first performing M cuts which correspond to steps 1 through 5 of the flow shown in FIG. 8. At this point, an optimization routine is invoked. In the first step (step 6), a timing analysis is performed. Step 7 determines what aspects of the placement fundamentally contribute to the timing problems. In order to achieve this, simple netlist changes, such as repowering, that create timing problems are first removed. Like-wise, it is important to buffer long wires and rebuild fan-out trees. After performing these operations, the remaining timing problems are either related to the placement characteristics or to the fundamental logic structure. The present optimization corrects the timing problems that are specifically related to the placement of the design. At this point in the flow, step 8 is invoked. Therein, all the nets of the design are sorted according to timing criticality. The nets having the largest criticality are then assigned high net weights. The entire list of nets is traversed, and weights are assigned to each net in proportion to its degree of criticality. The net weights become placement directives for subsequent iterations. The placement algorithm is sensitive to these weights, working hardest on nets that have large net weights. In this manner of directive generation, the placement algorithm is provided with an input that will help to minimize timing problems.

Following the creation of these directives, the flow of the algorithm returns to step 3, where the placement of the design returns to cut number K, and another cycle of placement of optimization begins. This cycle continues until a termination criterion is reached (see FIG. 4, line 9).

Whereas the present invention has been described in terms of a preferred embodiment, it will be understood by those skilled in the art that numerous changes and modification to the algorithm may be introduced without departing from the spirit of the invention, all of which fall within the scope of the appended claims.

The invention claimed is:

1. A method for optimizing the placement of a plurality of cells on a Very Large Scale Integrated Circuit (VLSI) chip comprising the steps of
   a) subdividing the plurality of cells into partitions by performing a sequence of cuts;
   b) for each of the cuts, estimating a future placement by performing additional cuts based on a result of the current cut;
   c) comparing the current placement to the estimated placement; and
   d) altering the priority of the placement at the current cut to ensure that the quality of the results achieved at the look ahead point is improved.

2. The method of claim 1 wherein in step b) further comprises the steps of
   performing a cost function analysis to quantify the quality of the placement;
   optimizing the quality of the placement; and
   generating placement directives to force the placement to move in a direction specified by the optimization.

3. The method of claim 2, wherein the selection of look ahead points varies in accordance with the level of optimization required.

4. The method of claim 2, wherein the degree of look ahead is variable and varies in accordance with the needs of a specific optimization.

5. The method of claim 2, wherein multiple optimizations are part of a single placement flow wherein a single optimization has the same or different degrees of look ahead.

6. The method of claim 2 wherein the cost function defines metrics that include the level of congestion of a placement and timing considerations.

7. The method of claim 2 wherein the optimization function identifies specific improvements that are required by the placement.

8. The method of claim 7 wherein the optimization function for timing comprises logic restructuring, repowering, and buffer insertion.

9. The method of claim 7 wherein the optimization function for congestion includes self-spreading of cells.

10. The method of claim 2 wherein the directives drive the placement process in a direction indicated by specific optimizations.

11. The method of claim 10 wherein the directives driving the placement towards a timing optimization comprise net weighting, capacitance, target generation, cell to cell affinities and cell to area affinities.

12. The method of claim 10 wherein the directives driving the placement towards a congestion optimization comprise the generation of reserve areas and cell expansion.

13. A method for optimizing the placement of a plurality of cells on a VLSI chip comprising the steps of:
   a) subdividing the plurality of cells into partitions by performing a sequence of cuts;
   b) iteratively managing the sequence of cuts to perform a look ahead operation, wherein the look ahead operation comprises the steps of:
      b1) performing a global routing,
      b2) evaluating the global routing congestion, and
      b3) performing a cell expansion an blockage insertion where a congestion is encountered;
   c) returning to the cut from where the look ahead operation was initiated by comparing the original placement with the cut provided by the look ahead operation; and
   d) altering the priority of the placement to ensure that the quality of the results achieved at the look ahead point is improved.

14. A method for optimizing the placement of a plurality of cells on a VLSI chip comprising the steps of:
   a) subdividing the plurality of cells into partitions by performing a sequence of cuts;
   b) iteratively managing the sequence of cats to perform a look ahead operation, wherein the look ahead operation comprises the steps of:
      b1) performing a timing analysis of the entire plurality of cells;
      b2) repowering and inserting buffers in a netlist to improve the timing and for determining which timing problems are related to the placement; and
      b3) generating net weights for critical nets;
   c) returning to the cut from where the look ahead operation was initiated by comparing the original placement with the cut provided by the look ahead operation; and d) altering the priority of the placement to ensure that the quality of the results achieved at the look ahead point is improved.

15. A program storage device readable by a machine, tangibly, embodying a program of instructions executable by the machine to perform method steps for performing static timing analysis of a digital system in the presence of a plurality of global sources of delay variation, said method steps comprising:
 a) subdividing the plurality of cells into partitions by performing a sequence of cuts;
 b) for each of the cuts, estimating a future placement by performing additional cuts based on a result of the current cut;
 c) comparing the current placement to the estimated placement; and
 d) altering the priority of the placement to ensure that the quality of the results achieved at the look ahead point is improved.

* * * * *